United States Patent [19]
Nagamine et al.

[11] Patent Number: 5,667,914
[45] Date of Patent: Sep. 16, 1997

[54] PROCESS FOR PREPARING CARBONACEOUS MATERIAL FOR NEGATIVE ELECTRODE OF CELL AND NON-AQUEOUS ELECTROLYTE SECONDARY CELL USING SAME

[75] Inventors: Masayuki Nagamine, Fukushima; Atsuo Omaru, Kanagawa; Naoyuki Nakajima, Fukushima, all of Japan

[73] Assignee: Sony Corporation, Tokyo, Japan

[21] Appl. No.: 647,755

[22] Filed: May 15, 1996

[30] Foreign Application Priority Data

May 17, 1995 [JP] Japan ................... 7-118625

[51] Int. Cl.$^6$ ................... H01M 10/40; C01B 31/02
[52] U.S. Cl. ................... 429/194; 423/448; 429/218
[58] Field of Search ................... 423/448; 429/218, 429/194; 264/29.7

[56] References Cited

U.S. PATENT DOCUMENTS 3,787,541 1/1974 Grindstaff et al. ................... 423/448
4,055,628 10/1977 McCarroll et al. ................... 423/448
4,725,422 2/1988 Miyabayashi et al. ................... 429/218 X
4,876,077 10/1989 Murakami ................... 423/448

*Primary Examiner*—Anthony Skapars
*Attorney, Agent, or Firm*—Hill, Steadman & Simpson

[57] ABSTRACT

A material for a negative electrode of a cell, which is prepared according to a process of the present invention, can provides a cell having a high true specific gravity, a high charging capacity and an excellent cycle characteristic. The process of the present invention comprises the steps of carbonizing an organic compound to form a carbide thereof, pulverizing said carbide to form a powder having an average particle size of 10 μm to 2 mm, and sintering said powder of the carbide at a temperature of 2,000° C. or higher to produce a graphite. In addition, in accordance with the present invention, there is also provided non-aqueous electrolyte secondary cell comprising a negative electrode, which is prepared by carbonizing an organic compound to form a carbide thereof, pulverizing the carbide to form a powder having an average particle size of 10 μm to 2 mm, and sintering the powder of the carbide at a temperature of 2,000° C. to form a graphite.

4 Claims, 1 Drawing Sheet

PROCESS FOR PREPARING CARBONACEOUS MATERIAL FOR NEGATIVE ELECTRODE OF CELL AND NON-AQUEOUS ELECTROLYTE SECONDARY CELL USING SAME

BACKGROUND OF THE INVENTION

1. Field of the Invention

This invention relates to a carbonaceous material suitable for the production of a negative electrode of a cell and a non-aqueous electrolyte secondary cell using the carbonaceous material, and more particularly to a carbonaceous material suitable for the production of a negative electrode of a lithium ion-based secondary cell, and the lithium ion-based secondary cell provided with the negative electrode made of Such a carbonaceous material and having a high discharge capacity and a high cyclic property.

2. Prior Art

In association with a recent remarkable progress of electronic techniques, reduction in size and weight of electronic devices has been realized continuously. There is therefore an increasing demand for portable power sources for such electronic devices, such as cells or batteries, which has a smaller size, a lower weight and a higher energy density than the conventional ones.

Hitherto, aqueous-electrolyte type cells such as lead batteries, nickel-cadmium cells and the like are predominately utilized as general-purpose secondary cells. However, these secondary cells of such an aqueous-electrolyte type are relatively satisfactory in cycle properties thereof but insufficient in weight reduction and energy density. In addition, they have posed an environmental problem. Accordingly, it is desirable to develop a novel cell system.

Under these circumstances, various studies and investigations have been made to develop an effective non-aqueous-electrolyte secondary cell (lithium ion-based secondary cells) in which lithium or an lithium alloy is used as a material for a negative electrode of the cell. Such a lithium ion-based secondary cell has excellent advantages such as a high energy density, a small self-discharge and a light weight.

However, the non-aqueous secondary cell has the following defect. That is, metal lithium is eluted from or deposited on the negative electrode in a charge/discharge cycle of the cell, so that a dendrite-like crystal which has grown on the negative electrode, reaches a positive electrode. That is, there is a possibility that a short circuit is caused within the cell. A probability of occurrence of the short circuit is increased, particularly as a charge/discharge cycle of the cell proceeds. Such a short circuit causes problems concerning safety and reliability, whereby a practical use of the cell is considerably prohibited.

To overcome the afore-mentioned problems posed when the metal lithium is used as a material for the negative electrode of the cell, since 1991, there has been proposed and practically utilized a non-aqueous electrolyte secondary cell (lithium ion-based secondary cell) which employs a negative electrode made of a carbonaceous material. The non-aqueous electrolyte secondary cell is worked according to a principle of a negative electrode reaction in which lithium is doped in a cavity between adjacent carbon atoms of the carbonaceous material or dedoped therefrom. When the cell is adequately designed, no crystallization of metal lithium occurs even when the charge/discharge cycle proceeds. Thus, the properly designed cell exhibits a good charge/discharge cycle property and a high safety. In addition, the cell is excellent in rapid charging and discharging property and low-temperature resistance.

Meanwhile, various carbonaceous materials usable for the negative electrode of the lithium ion-based secondary cell have been reported. Among them, a low-crystalline carbonaceous material which is produced by sintering an organic material such as cokes or glassy carbon at a relatively low temperature has been marketed and utilized at an earlier stage. As an electrolyte solution of the secondary cell whose negative electrode is made of the low-crystalline carbonaceous material, there is used a non-aqueous solvent composed primarily of propylene carbonate which is generally used in coin-shaped or cylindrical primary cells.

From a standpoint of imparting a high discharge capacity to the lithium ion-based secondary cell, there have been made various studies on a material for respective cell components such as a negative electrode and a positive electrode, as well as designing and charging/discharging methods. For example, one attempt has been made to use graphite as the material for negative electrode.

The graphite has a higher true specific gravity as compared with the low-crystalline carbonaceous material, so that a raw mixture for the negative electrode made of such a graphite shows a high packing density. Accordingly, the negative electrode material is advantageous in providing the cell with a high energy density. However, the graphite has not been initially used as the material for negative electrode because it causes decomposition of the electrolyte solution made of propylene carbonate in the charge/discharge cycle of the cell. Under this circumstance, it is conventionally considered that it would be difficult to use the graphite as the material for negative electrode. However, in recent years, it has been found that, when ethylene carbonate is used as a main component of the electrolyte solution in place of propylene carbonate, doping of lithium can be effectively performed without decomposition of the electrolyte solvent. This is true even when the graphite negative electrode having a highly-crystalline structure is used. Since 1994, a cell system employing a combination of the graphite and ethylene carbonate have been commercialized.

However, when the graphite material is used as a material for the negative electrode of the lithium ion-based secondary cell, there occurs a problem that it exhibits a low cycle property as compared with those in which a low-crystalline graphite material prepared by sintering the carbonaceous material at a relatively low temperature of 2000° C. or lower is used for the negative electrode.

In general, charging of the lithium ion-based secondary cell is carried out according to a constant voltage/constant current charging method in which a given charging voltage (upper charge voltage) and a given maximum charging current are employed.

In a lithium ion-based secondary cell whose negative electrode contains no metal lithium, lithium ions moved between the negative and positive electrodes in a charge/discharge cycle of the cell are provided by those dedoped from an active material of the positive electrode. The active material used as the positive electrode is specifically lithium-containing oxides or the like. The amount of the lithium ions dedoped from the active material of the positive electrode is determined by the voltage applied thereto, and the amount of lithium ions is increased as the voltage becomes higher. Accordingly, in order to obtain a cell having a high discharge capacity, it is advantageous that the cell has the upper charge voltage as high as possible.

Furthermore, in the lithium ion-based secondary cell in which the highly crystalline graphite material is used as the material of the negative electrode, there is a tendency that a high charging current causes deterioration in cycle property of the cell. Accordingly, if the negative electrode composed of such a graphite material is commercially used in the lithium ion-based secondary cell, it is desirable to employ an upper charge voltage as low as 4.1V, while it is general that an upper charge voltage of a charger is set to 4.2V in the case of the lithium ion-based secondary cell whose negative electrode is composed of a low-crystalline carbonaceous material.

In the lithium ion-based secondary cell employing the negative electrode composed of the graphite material, there is also a demand for increasing an upper charge voltage thereof to 4.2V in order to achieve a higher discharge capacity of the cell. By raising the upper charge voltage to such a level, the 4.2V charger used for the cell with the negative electrode composed of the low-crystalline carbonaceous material, which is now prevailing with a high reliability, can be applied to the cell having the graphite negative electrode, with a good interchangability. To meet this requirement, it is necessary to develop a graphite material not only having a maximum charging voltage of 4.2V but also exhibiting a good cycle property.

OBJECT AND SUMMARY OF THE INVENTION

The present invention has been accomplished in view of the afore-mentioned problems encountered in the prior art.

It is therefore an object of the present invention to provide a process for preparing a carbonaceous material suitable for a negative electrode of a cell with a high true specific density and a high electrode-charging property, whereby there can be obtained a cell showing not only a maximum charging voltage as high as 4.2V but also a good cycle property.

It is another object of the present invention to provide a non-aqueous electrolyte secondary cell provided with a negative electrode composed of such a carbonaceous material.

In order to achieve the afore-mentioned objects, in one aspect of the present invention, there is a process for preparing a material for a negative electrode of a cell, including the steps of carbonizing an organic compound to form a carbide thereof, pulverizing the carbide to form a powder having an average particle size of 10 μm to 2 mm, and sintering the powder of the carbide at a temperature of 2,000° C. or higher to produce a graphite.

In another aspect of the present invention, there is provided a non-aqueous electrolyte secondary cell including a negative electrode, the negative electrode being prepared by carbonizing an organic compound to form a carbide thereof, pulverizing the carbide to form a powder having an average particle size of 10 μm to 2 mm, and sintering the powder of the carbide at a temperature of 2,000° C. to form a graphite.

These and other objects, features and advantages of the present invention will become more apparently from the following detailed description when read in conjunction with the accompanying drawings and the appended claims.

DETAILED DESCRIPTION OF THE INVENTION

Figure 1:
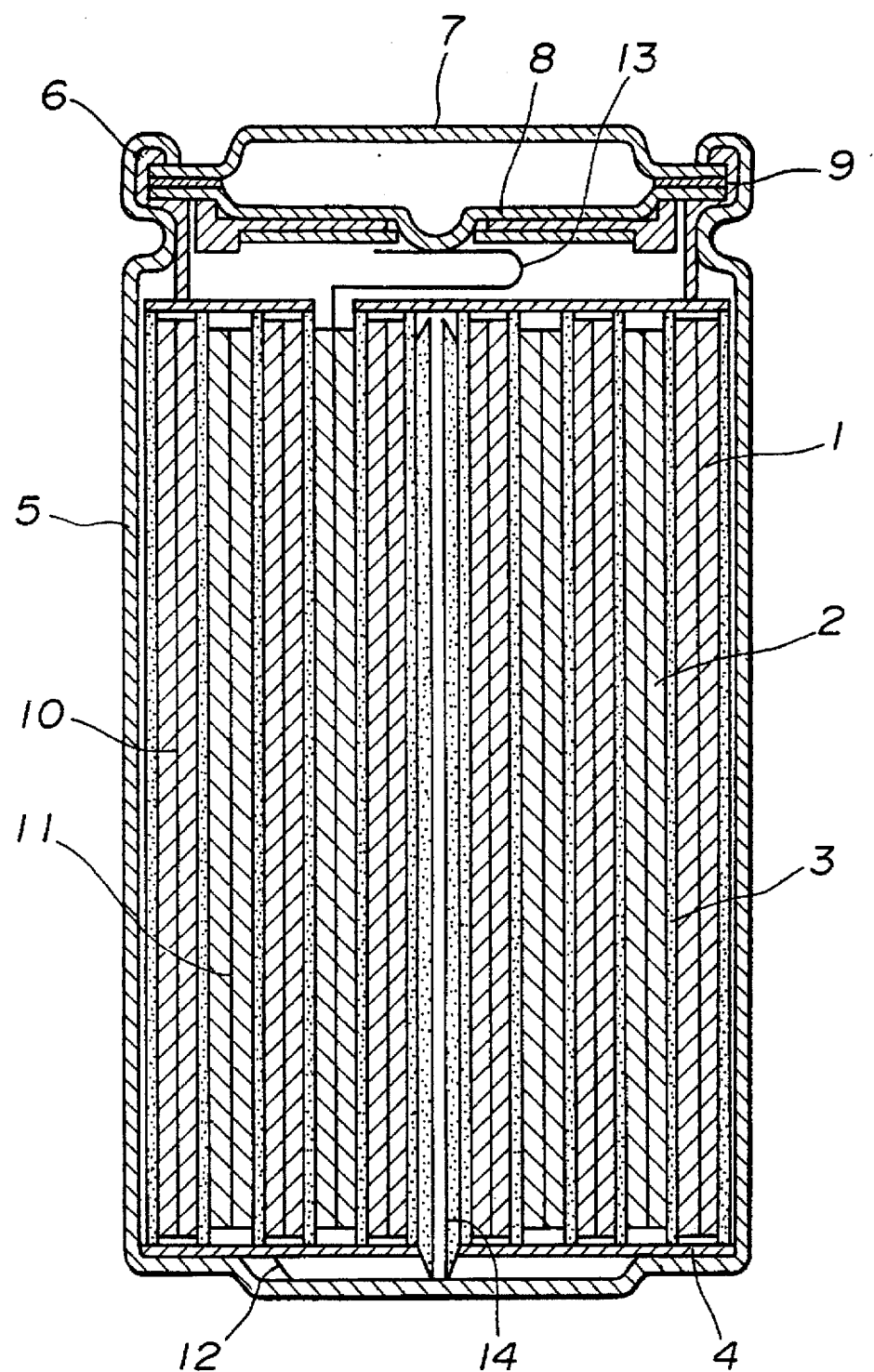
FIG. 1 is a vertical cross-sectional view of a non-aqueous electrolyte secondary cell according to one embodiment of the present invention.

Examples of the graphite material suitable for the production of a negative electrode of a non-aqueous electrolyte secondary cell generally includes a natural graphite and a synthetic graphite. The latter is prepared by carbonizing and graphitizing an organic compound.

In the present invention, there is used a synthetic graphite material Obtained by controlling production conditions thereof. The synthetic graphite material is suitable for the production of a negative electrode which can exhibit a sufficient resistance when applied to a charge/discharge cycle at an upper charging voltage of 4.2V or higher.

In the production of such a synthetic graphite material, various organic compounds can be generally used as a starting material. The organic compound is first carbonized at a temperature of 300° C. to 700° C. in a gaseous stream containing an inert gas such as a nitrogen gas (carbonization process). A resultant carbide is then heated to a temperature of 900° C. to 1,500° C. at a rate of 1° C. to 100° C. per minute and allowed to stand at that temperature for 0 to 30 hours (calcination process). The calcined product is further heat-treated at a temperature of 2,000° C. or higher, preferably 2,500° C. or higher (graphitization process) to obtain the aimed graphite material. The thus prepared graphite material is usually used in the from of powder for the production of the negative electrode of the cell.

The formation of the powder (pulverization process) may be carried out after any of a series of the afore-mentioned carbonization-, calcination- and graphitization-processes. However, from a standpoint of handling-easiness upon manufacture and enhancement of the graphitization degree, the pulverization process is usually carried out after the graphitization process.

However, as a result of various studies and investigations made by. the present inventors, it has been found that a characteristic of the resultant graphite material varies largely depending upon a grain size of the material used in the graphitization process even if the same starting material and the same conditions concerning temperature, time and atmosphere are employed.

In view of the above findings, in the present invention, the material to be subjected to the graphitization process is pulverized in advance to form a powder having an average particle size of 10 μm to 2 mm. Incidentally, the average particle size means a 50% cumulative grain size.

In case that a massive or shaped graphite material is subjected to the graphitization process as done in many cases, the cell with the negative electrode composed of such a graphite material shows deterioration in cycle property thereof, particularly when an upper charging voltage of 4.2V or higher is employed.

Even though the pulverization of the graphite material is carried out in advance of the graphitization process, when the pulverized graphite material has an average particle size greater than 2 mm, there also occurs the problem that the cycle property of the cell with the negative electrode composed of such a graphite material is deteriorated at the upper charging voltage of 4.2V or higher. Conversely, if the graphite material is pulverized to a fine powder having an average particle size smaller than 10 μm in advance of the graphitization process, the resultant graphitized powder correspondingly has a particle size of 10 μm or smaller. If such a fine graphite powder is used for the negative electrode of the cell, a discharge capacity thereof is likely to be deteriorated during storage, whereby a good shelf stability of the cell cannot be obtained.

On the other hand, when the graphite material is pulverized to a powder having an average particle size ranging from 10 μm to 2 mm and such a finely pulverized graphite material is subjected to the graphitization process, the cell with the negative electrode composed of such a graphite material exhibits a good cycle property and an excellent shelf stability even when the cell is exposed to an upper charging voltage of 4.2V or higher. The average particle size of the material to be subjected to the graphitization process is preferably in the range of 15 µm to 200 µm, more preferably 15 µm to 40 µm.

When the thus-produced graphite powder is actually applied to the production of the negative electrode, the average particle size of the graphite be finally adjusted to preferably the range of 10 µm to 50 µm, more preferably 15 µm to 40 µm. If the average particle size of the graphite powder used for the production of the negative electrode exceeds 50 µm, there is a tendency that a heavy-load property of the cell is deteriorated. On the other hand, if the average particle size is less than 10 µm, a shelf stability of the cell is insufficient. Accordingly, when the average particle size of the graphite powder is greater than the upper value of the afore-mentioned range, it is required that an additional pulverization process is conducted after the graphitization process. However, if the graphite material having an average particle size ranging from 15 µm to 40 µm is already prepared in the initial pulverization process which has been conducted before the graphitization process, no further pulverization process is required because an average particle size of the finally produced graphite powder can be also fallen within the range. The graphite powder meeting the requirement of the afore-mentioned grain size is considerably effective to produce a cell having an extremely high cycle property.

Meanwhile, in the pulverization process(es) to be conducted before and/or after the graphitization process, a classification treatment may be simultaneously performed to obtain the graphite material having a uniform grain size. The classification treatments may be performed by using a conventional method such as a screen method, a pneumatic classifying method or the like.

As described above, in the method according to the present invention, the pulverization process is incorporated between the carbonization and graphitization processes in order to obtain the graphite powder capable of resisting the charge/discharge cycle in which an upper charging voltage of 4.2V or higher is employed. In the pulverization process, the carbide formed in the carbonization process is pulverized to obtain the graphite powder having an average particle size of 10 µm to 2 mm.

Incidentally, typical organic compounds usable as a starting material for the production of the graphite powder may include coals or pitches.

Specific examples of the pitches may include pyrolytic tars such as coal tar, ethylene bottom oil or crude oil, distillates prepared by using vacuum distillation, atmospheric distillation or steam distillation, e.g., asphalt, thermal polycondensates, extracts, chemical polycondensates, dry distillates prepared from wood, or the like. In addition, the pitches may be those prepared from polymer compounds as a starting material, such as a polyvinyl chloride resin, polyvinyl acetate, polyvinyl butyrate, 3, 5-dimethyl phenol resin, or the like.

In the course of the carbonization process, coals, the pitches and the organic compounds is present in a liquid state up to about 400° C. When maintained at the temperature range, these materials are subjected to a condensation between aromatic rings whereby a product composed of a polycyclic compound and having a laminated structure is obtained. Thereafter, when the product is heated to a temperature higher than about 500° C., a solid carbon precursor (semi-coke) is formed. This process is generally called a liquid phase carbonization process which is typical to produce a graphitizable carbon.

Furthermore, compounds which are usable as the starting material for the graphite material, may include polycyclic hydrocarbons, such as naphthalene, phenanthrene, anthracene, triphenylene, pyrene, perylene, pentaphene, pentacene or the derivatives thereof (which include carboxylates, carboxylic acid anhydrides, carboxylimide and a mixture thereof), condensed heterocyclic compounds such as acenaphthylene, indole, iso-indole, quinoline, iso-quinoline, quinoxaline, phthalazine, carbazole, acridine, phenazine, phenatolidine or derivatives thereof, or the like.

The afore-mentioned organic compounds are subjected to carbonization, pulverization and graphitization processes to produce graphite. The pulverization process can be conducted under the afore-mentioned conditions. In addition, the carbonization and graphitization processes can be conducted under an environmental condition known in conventional thermal treatment methods.

However, in the graphitization process, sintering of the raw material is preferably carried out in an inert gas-containing atmosphere, more preferably in an inert gas-containing stream which is passed through a reaction system at a flow rate of 0.1 cm³ per minute or more based on one gram of the raw material. When the sintering of the raw material is conducted in such an inert gas-containing stream, volatile components is effectively removed from the raw material so that the resultant graphite exhibits an excellent lithium-doping ability. Furthermore, when the sintering is carried out under a vacuum-evacuating condition, removal of the volatile components in the raw material is promoted, whereby the graphite produced can show more excellent lithium-doping ability.

The non-aqueous electrolyte secondary cell according to the present invention is manufactured by using the thus-produced graphite as a material for the negative electrode thereof.

The graphite powder used for the production of the negative electrode of the cell preferably has a true specific gravity of 2.10 g/cm³ or more, more preferably 2.18 g/cm³ or more to achieve a high packing density of the electrode.

In order to obtain the graphite powder having such a high true specific gravity, it is desired that the graphite satisfies the following requirements concerning an interplanar spacing of 002 plane, a thickness of crystallite along c-axis, a bulk specific gravity, an average shape parameter $X_{ave}$, and a G value according to Laser-Raman spectroscopy.

That is, the interplanar spacing of 0002 plane is in the range of 0.335 nm to 0.34 nm (inclusive of both values), preferably 0.335 nm to 0.337 nm (inclusive of both values). The thickness of crystallite along c-axis is preferably not less than 16.0 nm, more preferably not less than 24.0 nm.

The bulk specific gravity, which is a value obtained according to JIS K-1469, is 0.3 g/cm³ or more.

The average shape parameter $X_{ave}$ is desirably not more than 125. Incidentally, a shape parameter (x) is calculated by the following equation:

$$x = (L/T) \times (W/T)$$

where x represents the shape parameter; T is a thickness of a thinnest part of the powder; L is a length of a major axis of the powder; and W is a length of the powder along the direction perpendicular to the major axis.

The average shape parameter $X_{ave}$ means an average value of the shape parameters (x) and is obtained by using the following method.

First, a specimen of a graphite powder is observed using a scanning electron microscope (SEM) to select 10 particles whose particle sizes are within the range of ±30% of the average particle size of the entire graphite powder when measured by means of a grain-size distribution measuring apparatus used in a laser-diffraction method or the like. The shape parameters (x) of the selected ten particles are calculated by using the afore-mentioned equation to obtain an average value thereof.

The Laser-Raman spectroscopy is a measuring method which reflects information concerning oscillation of a crystal structure of the carbonaceous material at a high sensitivity. The G value obtained by the Raman spectroscopy is an index useful to evaluate a micro-structural defect and represents a ratio of an integrated intensity of Raman band due to an amorphous structure to that due to a complete graphite structure in the carbonaceous material. The G value is preferably 2.5 or more. If the G value is less than 2.5, it is not necessarily assured that the graphite has a true specific gravity of 2.1 g/cm$^3$ or more.

In addition to the afore-mentioned parameters of the crystal structure and the shape parameter, the resultant graphite preferably has a discharge capacity of 250 mAh/g or higher, preferably 270 mAh/g or higher when measured at the first cycle by an intermittent charging and discharging method, as described hereinafter.

On the other hand, the preferred materials for the positive electrode of the cell are those containing a large amount of dedopable and dopable lithium. One example of such a material for the positive electrode is lithium/transition metal composite oxides which is represented by the general formula of $Li_xNi_yCo_{1-y}O_2$ wherein $0.05 \leq x \leq 1.10$, and therefore contains at least one of nickel and cobalt.

Such a lithium/transition composite oxide can be prepared by mixing lithium and a hydroxide, an oxide or a carbonate of transition metal such as cobalt or nickel with each other at adequate proportions and then sintering the mixture at a temperature of 60° to 1,000° C.

The electrolyte solution used in the cell according to the present invention, may be a solution prepared by dissolving a lithium salt in a non-aqueous solvent.

In this case, since the negative electrode of the cell according to the present invention is composed of the graphite material, the use of propylene carbonate, which is likely to be decomposed by graphite, should be avoided. Instead, the electrolyte solution preferably contains, as one of main components of the non-aqueous solvent, ethylene carbonate. In view of various characteristics of the cell, a combination of plural solvents as described below is desirably used.

For instance, chain-like esters are desirably used as a component of the solvent, which can be combined with the ethylene carbonate, due to its high voltage resistance. Suitable chain-like esters may be carbonates, carboxylates, phosphates or the like. Especially, chain-like carbonates are preferred. If these chain-like esters is mixed with the electrolyte solution, decomposition of the solvent is effectively prohibited in a charge cycle of the cell. The use of the chain-like esters also provides an enhanced electrical conductivity so that improved electrical current characteristic of the cell can be obtained. Furthermore, a solidification point of the electrolyte solution is lowered by the use of the chain-like esters, which leads to an improvement in low-temperature characteristic of the cell and lowering of the reactivity with metal lithium whereby a high safety of the cell can be achieved.

Specific examples of the afore-mentioned chain-like carbonates may include asymmetric chain-like carbonates such as methylethyl carbonate (MEC), methylpropyl carbonate (MPC), and mixture solvents containing the asymmetric chain-like carbonate, such as a mixture solvent of methylethyl carbonate and dimethyl carbonate (DMC) or a mixture solvent of methylethyl carbonate and diethyl carbonate (DEC). In addition, a mixture solvent containing symmetric chain-like carbonate, such as a combination of dimethyl carbonate and diethyl carbonate, can be relatively suitably used for this purpose.

The mixing ratio of ethylene carbonate to components other than the ethylene carbonate in the solvent is preferably in the range of 7:3 to 3:7 on a volume basis.

The components other than the ethylene carbonate may be composed of a plurality of compounds. In case the components are composed of a mixture of methylethyl carbonate (MEC) and dimethyl or diethyl carbonate (DMC or DEC), the mixing ratio of methylethyl carbonate (MEC) to dimethyl or diethyl carbonate (DMC or DEC) is preferably in the range of 2:8 to 9:1. In case the components is composed of a mixture of dimethyl carbonate (DMC) and diethyl carbonate (DEC), the mixing ratio of dimethyl carbonate (DMC) to diethyl carbonate (DEC) is preferably in the range of 1:9 to 9:1.

An electrolyte dissolved in the electrolyte solution is any electrolyte used in this type of cell. Examples of the electrolytes may include $LiClO_4$, $LiAsF_6$, $LiPF_6$, $LiBF_4$, $LiB(C_6H_5)_4$, $LiCl$, $LiBr$, $LiSO_3CH_3$, $LiSO_3CF_3$, $LiN(SO_2CF_3)_2$, $LiC(SO_2CF_3)_3$, or the like. The preferred electrolyte is $LiPF_6$.

The graphite material used for the negative electrode of the cell is produced by carbonizing the organic compound and then sintering the resultant carbide at an elevated temperature of 2,000° C. or higher, as described above. In the method according to the present invention, the carbide is preliminarily pulverized to form a powder of the carbide having an average particle size of 10 µm to 2 mm before subjected to the graphitization process.

When the negative electrode is formed from the graphite powder thus prepared through the afore-mentioned processes including the pulverization process, the cell having the negative electrode with a high packing density can be obtained. In addition, even when an upper charging voltage of the cell is adjusted to 4.1V or more, especially 4.2V or more, the cell can exhibit a good cycle property. Thus, the cell does not show any inconvenience at a high upper charging voltage. Accordingly, the cell can be improved in energy density.

Furthermore, if the graphite powder has a final average particle size of 10 µm to 50 µm, the cell has a good shelf stability and a good heavy-load property.

EXAMPLES

The present invention is described in detail below by way of experimental examples.

Preparation of Material for Negative Electrode

A material for a negative electrode was prepared in the following manner.

A petroleum pitch was calcinated at a temperature of 1,200° C., and then pulverized. The pulverized material was sintered (graphitized) at a temperature of 3,000° C. in an inert gas-containing atmosphere. The graphitized product was pulverized again to form a synthetic graphite powder. Thus, graphite powder specimens Nos. 1 to 9 were obtained. Among the specimens, the graphite powder specimens Nos. 1 and 2 were prepared without the earlier pulverization process before the graphitization process while the graphite powder specimens Nos. 6 to 9 were prepared without the later pulverization process after the graphitization process.

Average particle sizes of the specimen Nos. 1 to 9 before and after the graphitization process are shown in Table 1.

Incidentally, in the event that the graphite powder had an average particle size less than about 100 µm, the average particle size of each graphite powder specimen was determined by using a laser diffraction-type grain distribution-measuring apparatus. The average particle size is a value on a volume basis and represents a 50% cumulative particle size of the powder. On the other hand, in the event that the graphite powder had an average particle size of about 100 µm or more, a scanning electron microscope (SEM) was used to determine the average particle size of each graphite powder specimen. In the latter case, the average particle size was obtained only as an approximate value.

TABLE 1

| Graphite powder specimen No. | Pulverization before graphitization | Average particle size before graphitization | Pulverization after graphitization | Final average particle size after graphitization |
|---|---|---|---|---|
| 1 | No | 10 mm | Yes | 31 µm |
| 2 | No | 2 mm | Yes | 30 µm |
| 3 | Yes | 0.5 mm | Yes | 63 µm |
| 4 | Yes | 0.2 mm | Yes | 48 µm |
| 5 | Yes | 0.1 mm | Yes | 38 µm |
| 6 | Yes | 32 µm | No | 29 µm |
| 7 | Yes | 18 µm | No | 15 µm |
| 8 | Yes | 12 µm | No | 11 µm |
| 9 | Yes | 5 µm | No | 5 µm |

The graphite powder specimen No. 6 selected as a typical example of the graphite powder, was subjected to a powder X-ray diffraction measurement to obtain an interplanar spacing of (002) plane and a thickness of crystallite along c-axis thereof. In addition, a G value of the graphite powder specimen was obtained by a Laser-Raman spectroscopy and a true specific gravity thereof was obtained by using a pycnometer method (n-butanol immersion method).

As a result, it was confirmed that the interplanar spacing of (002) plane was 0.337 nm and the thickness of crystallite along c-axis was 30 nm. In addition, the G value according to the Laser-Raman spectroscopy was 13.6 and the true specific gravity according to the pycnometer method was 2.22.

Next, a test electrode was prepared by using the graphite powder specimen No. 6. The negative electrode was incorporated into a test cell, which was then measured to obtain its discharge capacity per one gram.

Meanwhile, the test electrode was prepared in the following manner.

Immediately before the preparation of the negative electrode, the above-prepared graphite powder was preliminarily heated up to a temperature of 800° C. at a temperature rise rate of about 30° C. per minute in an argon atmosphere and allowed to stand for i hour at that temperature. The graphite powder was then cooled to room temperature. The thus-prepared carbonaceous powder material was mixed with with 10% by weight of polyvinylidene fluoride as a solvent. The resultant mixture was dried to prepare a test mixture. 37 mg of the test mixture was shaped, together with a nickel net serving as a current collector, into a pellet having a diameter of 15.5 mm to prepare the test electrode.

The thus-prepared test electrode was accommodated in a cell casing. The cell casing was then fitted in a mating manner through a separator to an electrode cap in which a counter electrode (metal lithium) was mounted so that the test electrode (as a working electrode), the separator and the counter electrode were arranged in an overlapped and laminated relation to each other. After the respective electrodes were impregnated with the electrolyte solution, peripheral mated edges of the cell casing and the electrode cap were caulked through a seal gasket to prepare a coin-shaped test cell having a hermetically sealed interior. Materials for the counter electrode, the separator and the electrolyte solution and the dimension of the cell were as follows. Incidentally, the afore-mentioned cell production was carried out in the dry air having a dew point of −40° C. or lower.

Constitution of Test Cell

Cell dimension: Coin-shape having a diameter of 20 mm and a thickness of 2.5 mm;

Counter electrode: Metal lithium;

Separator: Polypropylene porous membrane;

Electrolyte solution: Solution dissolving 1 mole/l of $LiPF_6$ in a mixture solvent of ethylene carbonate and diethyl carbonate (volume ratio=1:1).

The thus-produced test cell was subjected to a charge/discharge cycle in which a discharge capacity thereof was measured by using an intermittent charging and discharging method.

The charge/discharge cycle according to the intermittent charging and discharging method is described in detail below. Strictly speaking, in the intermittent charging and discharging method, a process in which lithium is doped in the carbonaceous material is a discharge cycle and a process in which lithium is dedoped from the carbonaceous material is a charge cycle. However, hereinafter, for the sake of convenience in view of commercially available cell products, the former process in which lithium is doped in the carbonaceous material is called a "charge" cycle while the latter process in which lithium is dedoped from the carbonaceous material is called a "discharge" cycle.

First, the test cell was charged at a constant current of 0.5 mA for one hour, followed by two hour-interruption. The one hour-charge/two hour-interruption cycle was repeated until an equilibrium potential estimated by plotting a change in cell voltage every −½ hour in the interruption period, reached 3 to 15 mV (Li/Li+). Successively, the cell was discharged at a constant current of 0.5 mA for one hour, followed by two hour-interruption. The one hour-discharge/two hour-interruption cycle was repeated until a terminal voltage of the cell reached 1.5V to obtain a total discharge capacity of the cell. Based on the thus-obtained total discharge capacity, a discharge capacity per one gram of the carbonaceous material was calculated. As a result, it was confirmed that the cell employing the carbonaceous material had a discharge capacity of 300 mAh/g.

Preparation of Material for Positive Electrode

A material for the positive electrode was prepared in the following manner.

Lithium hydroxide and cobalt oxide were mixed with each other such that the atomic ratio of lithium to cobalt was 1:1. The mixture was then sintered in an oxygen-containing atmosphere at a temperature ranging from 700° C. to 800° C. for 12 hours. The resultant sintered product was pulverized and then subjected to a X-ray diffraction measurement. The result of the measurement revealed that a peak of plots in the X-ray diffraction of the sintered product was coincident with a peak of $LiCoO_2$ recorded in JCPD file. Thus, it was confirmed that the sintered product was $LiCoO_2$.

Preparation of Test Cell

Next, by using the above-prepared materials for the negative and positive electrodes, a lithium ion-based secondary cell was produced. The thus-produced cell is shown in FIG. 1.

The negative electrode 1 of the cell was produced in the following manner.

Each of the afore-mentioned graphite powder specimens Nos. 1 to 9 was used as the material for the negative electrode of the cell. 90 parts by weight of the graphite powder was mixed with 10 parts by weight of a vinylidene fluoride resin as a binder to prepare a mixture for the negative electrode. The mixture was dispersed in N-methyl-2-pyrrolidene as a solvent to form a pasty slurry. The pasty slurry was coated on opposite surfaces of a band-like copper foil serving as a negative electrode current collector 10 and having a thickness of 10 μm, dried and pressure-formed into the band-like negative electrode 1.

The positive electrode 2 was prepared in the following manner.

91 parts by weight of $LiCoO_2$ prepared above, 6 parts by weight of graphite powder serving as a conductive material and 3 parts by weight of a vinylidene fluoride resin as a binder were mixed with each other to prepare a mixture for the positive electrode. The mixture was then dispersed in N-methyl-2-pyrrolidene as a solvent to form a pasty slurry. The pasty slurry was coated on opposite surfaces of a band-like aluminum foil serving as a positive electrode current collector 11 and having a thickness of 20 μm, dried and pressure-formed into the band-like positive electrode 2.

The band-like negative electrode 1, the band-like positive electrode 2 and the separators 3 made of a finely-porous polyolefin film were laminated such that the negative electrode 1, the first separator 3, the positive electrode 2 and the second separator 3 were overlapped in this order. The thus-prepared laminate was rolled to form many layers from center to the outside and an outer free end of the laminate was fixed onto an outer surface of the rolled laminate by means of an adhesive tape so that a roll electrode having an outer diameter of 18 mm was obtained.

The roll electrode was accommodated in a nickel-plated iron cell casing 5. Insulating plates 4 were attached to opposite end faces of the roll electrode in the cell casing. An aluminum lead wire 13 was connected at one end thereof to the positive electrode current collector 11 and welded at the other end thereof onto a projection of a safety valve 8 electrically connected to the cell lid 7, while a nickel lead wire 12 was connected at one end thereof to the negative electrode current collector 10 and welded at the other end thereof onto a bottom of the cell casing 5.

Poured into the cell casing 5 accommodating the roll electrode was the electrolyte solution prepared by dissolving 1 mole/l of $LiPF_6$ in a mixture solvent composed of ethylene carbonate and methylethyl carbonate. Peripheral edges of the cell casing 5 were caulked together with insulating seal gaskets placed thereon whereby the safety valve 8 having a current-shut-off mechanism, a positive temperature coefficient (PTC) element 9 and the cell lid 7 were fixed together in the cell casing 5 and a hermetically sealed interior is formed in the cell. In the afore-mentioned cell production process, the test cells Nos. 1 to 9, which were cylindrical lithium ion-based secondary cells and each had a diameter of 18 mm and a height of 65 mm, were prepared.

Discharge capacity, charge/discharge cycle property, heavy-load property and shelf stability of the thus-prepared test cells were evaluated as follows.

Discharge Capacity

Each test cell was charged for 3 hours by setting an upper charge voltage to 4.2V and a charge current in constant current region to 1 A. Thereafter, the cell was discharged at a constant current of 0.2 A until the cell voltage was decreased to 2.75V to measure a discharge capacity thereof.

Charge/Discharge Cycle Property

Each test cell was charged for 3 hours by setting an upper charge voltage to 4.2V and a charge current in constant current region to 1 A. Thereafter, the test cell was discharged at a constant output of 2.5 W until the cell voltage was decreased to 2.5V. The charge/discharge cycle was repeated to measure the discharge capacities at the 1st and 200th cycles, which were each obtained at the time when the cell voltage was decreased to 2.75V. The charge/discharge cycle property was determined as a ratio of the discharge capacity at the 200th cycle (discharge capacity 2) to that at the 1st cycle (discharge capacity 1), which was specifically given by the following equation:

[discharge 2]/[discharge 1]×100 (%)

Heavy-Load Property

Each test cell was charged for 3 hours by setting an upper charge voltage to 4.2V and a charging current in constant current region to 1 A. Thereafter, the test cell was discharged at a constant current of 0.2 A until the cell voltage was decreased to 2.75V to measure a discharge capacity of the cell (discharge capacity 3). After charged under the same conditions as described above, the test cell was discharged at a constant current of 3 A until the cell voltage was decreased to 2.75V to measure a discharge capacity of the cell (discharge capacity 4). The heavy-load property was determined as a ratio of the discharge capacity 4 to the discharge capacity 3, which was specifically given by the following equation:

[discharge 4]/[discharge 3]×100 (%)

Shelf Stability

Each test cell was charged for 3 hours by setting an upper charge voltage to 4.2V and a charge current in constant current region to 1 A. Thereafter, the test cell was discharged at a constant output of 2.5 W until the cell voltage was decreased to 2.5V, during which a discharge capacity at the time when the cell voltage was decreased to 2.75V was measured. The discharge capacity was referred to as "discharge capacity before storage." Separately, the test cell was charged under the same conditions as described above and stored for one month at an ambient temperature of 45° C. After the one-month storage, the test cell was discharged at a constant output of 2.5 W until the cell voltage was decreased to 2.5V. Successively, the test cell was subjected to five charge/discharge cycles under the same conditions as described above. At each cycle, the discharge capacity (referred to as "discharge capacity after storage") was measured to obtain a ratio thereof to the discharge capacity before storage, which was specifically given by the following equation:

[discharge capacity after storage]/[discharge capacity before storage]×100 (%)

The maximum value of the thus-obtained ratios was determined to be a discharge capacity restoration rate of the cell.

The results of the afore-mentioned measurements are shown in Table 2 as well as the kind of the graphite powder used as a material for the negative electrode of each cell.

TABLE 2

| Cell No. | Graphite specimen No. | Discharge capacity (Ah) | Cycle property (%) | Heavy-load property (%) | Shelf stability (%) |
| --- | --- | --- | --- | --- | --- |
| 1 | 1 | 0.142 | 65 | 81 | 92 |
| 2 | 2 | 0.143 | 80 | 82 | 90 |
| 3 | 3 | 0.134 | 78 | 66 | 94 |
| 4 | 4 | 0.137 | 82 | 73 | 93 |
| 5 | 5 | 0.141 | 83 | 78 | 93 |
| 6 | 6 | 0.143 | 85 | 81 | 92 |
| 7 | 7 | 0.147 | 86 | 83 | 88 |
| 8 | 8 | 0.148 | 87 | 85 | 86 |
| 9 | 9 | 0.149 | 89 | 88 | 83 |

It was noted from Table 2 that the test cells Nos. 2 to 9 in which the graphite powder used had an average particle size of 2 mm or less before the graphitization process, exhibited a good cycle property ranging from about 80% to about 90%. On the other hand, the test cell No. 1 in which the graphite powder used had an average particle size of 10 mm, exhibited an insufficient cycle property as low as 65%.

This indicated that the grain size of the material in the graphite production process, especially in the graphitization process, gave a large influence on the cycle property of the resultant cell. As a result, it was confirmed that, when the graphite powder before the graphitization process had an average particle size of 2 mm or less, the cycle property of the cell was improved.

Among the test cells Nos. 2 to 9, the test cell No. 9 contained the carbonaceous material having an average particle size as small as 5 μm before the graphitization process, which results in producing a final graphite powder having the same average particle size as fine as 5 μm. The test cell was superior in cycle property but inferior in shelf stability as compared with those of other test cells. In addition, even in case the graphite material was subjected to the pulverization process but had a final average particle size as large as 63 μm, for example, that used for the test cell No. 3, it was confirmed that the test cell using such a graphite powder was inferior in heavy-load property as compared with other test cells.

In consequence, in order to satisfy all the requirements concerning cycle property, heavy-load property and shelf stability, the average particle size of the carbonaceous material before the graphitization process should be in the range of 10 μm to 2 mm and the average particle size of the finally produced graphite powder should be in the range of 10 μm to 50 μm.

Furthermore, detailed studies on the afore-mentioned results revealed that the test cells Nos. 4 to 8 in which the carbonaceous powder having an average particle size of 200 μm or less before subjected to the graphitization process was employed, exhibited a good cycle property. Among them, the test cells Nos. 6 to 8, in which the carbonaceous material having an average particle size of 40 μm or less before the graphitization process was employed and therefore the resultant graphite powder was not pulverized after the graphitization process, exhibited a considerably excellent cycle property. The test cells Nos. 2 to 7, in which the graphite material having an average particle size of 15 μm or more before and after the graphitization was used, showed a good shelf stability. The test cells Nos. 5 to 8, in which the graphite material having a final average particle size of 40 μm or less was used, showed a good heavy-load property.

As a result, it was confirmed that, in order to obtain cells having an excellent characteristics, the average particle size of the carbonaceous powder before the graphitization process is preferably in the range of 15 μm to 200 μm, more preferably 15 μm to 40 μm, and the final average particle size of the graphite powder after the graphitization process is preferably in the range of 15 μm to 40 μm.

What is claimed is:

1. A process for preparing a material for a negative electrode of a cell, comprising the steps of:

carbonizing an organic compound to form a carbide thereof;

pulverizing said carbide to form a powder having an average particle size of 10 μm to 2 mm; and sintering said powder of the carbide at a temperature of 2,000° C. or higher to produce a graphite.

2. The process as claimed in claim 1, wherein said powder of the carbide has an average particle size of 15 μm to 40 μm.

3. The process as claimed in claim 1, wherein said graphite is pulverized after sintering to form a powder having an average particle size of 10 μm to 50 μm.

4. A non-aqueous electrolyte secondary cell comprising a negative electrode, said negative electrode being prepared by carbonizing an organic compound to form a carbide thereof, pulverizing said carbide to form a powder having an average particle size of 10 μm to 2 mm, and sintering said powder of the carbide at a temperature of 2,000° C. to form a graphite.

* * * * *

UNITED STATES PATENT AND TRADEMARK OFFICE
CERTIFICATE OF CORRECTION

PATENT NO. : 5,667,914
DATED : September 16, 1997
INVENTOR(S) : Masayuki Nagamine, et al.

It is certified that error appears in the above-indentified patent and that said Letters Patent is hereby corrected as shown below:

In Claim 4, at line 6, after "2000°C", please insert --or higher--,

Signed and Sealed this

Thirty-first Day of March, 1998

Attest:

BRUCE LEHMAN

Attesting Officer

Commissioner of Patents and Trademarks